No. 758,093. PATENTED APR. 26, 1904.
J. C. McDOUGALL.
GRAIN SHOCKING ATTACHMENT FOR BINDERS.
APPLICATION FILED MAR. 14, 1903.
NO MODEL. 6 SHEETS—SHEET 1.

Witnesses:
Inventor,
James C. McDougall,
By Marion & Marion
Attorneys

No. 758,093. PATENTED APR. 26, 1904.
J. C. McDOUGALL.
GRAIN SHOCKING ATTACHMENT FOR BINDERS.
APPLICATION FILED MAR. 14, 1903.
NO MODEL. 6 SHEETS—SHEET 5.

Witnesses:

Inventor,
James C. McDougall,
By Marion & Marion
Attorneys

No. 758,093. PATENTED APR. 26, 1904.
J. C. McDOUGALL.
GRAIN SHOCKING ATTACHMENT FOR BINDERS.
APPLICATION FILED MAR. 14, 1903.
NO MODEL. 6 SHEETS—SHEET 6.

Witnesses:
James C. McDougall, Inventor,
By Marion & Marion
Attorneys

No. 758,093. Patented April 26, 1904.

UNITED STATES PATENT OFFICE.

JAMES CARTER McDOUGALL, OF VIRDEN, CANADA.

GRAIN-SHOCKING ATTACHMENT FOR BINDERS.

SPECIFICATION forming part of Letters Patent No. 758,093, dated April 26, 1904.

Application filed March 14, 1903. Serial No. 147,757. (No model.)

*To all whom it may concern:*

Be it known that I, JAMES CARTER McDOUGALL, a subject of the King of Great Britain, residing at Virden, in the county of Dennis, in the Province of Manitoba, Canada, have invented certain new and useful Improvements in Grain-Shocking Attachments for Binders; and I do hereby declare that the following is a full, clear, and exact description of the invention, such as will enable others skilled in the art to which it appertains to make and use the same.

My invention relates to apparatus for automatically shocking the grain received in sheaves from a self-binder—that is to say, collecting the sheaves and piling them upright in separate shocks at regular intervals along the path of the grain-binder.

The object of my invention is to produce a machine that may be formed as an addition or attachment to the self-binding harvester at present in common use and which is worked by the main driving mechanism thereof entirely automatically, which shall be of light, cheap, and simple construction, and combined on easy-running principles to perform its functions in a proper manner.

To these ends my invention consists, generally speaking, in a shock-forming receiver mounted to turn on a horizontal shaft and normally supported in a raised horizontal position to receive the sheaves of grain and adapted to be turned about its axis at regular intervals to dump the sheaves upon the ground, a retaining or butter plate adapted to form a closure for the front end of the receiver to hold the sheaves against falling out until the shock is ready to be set up, a sheaf-carrier adapted to reciprocate in a curved path between the lower end of the binder-deck and a point immediately over said shock-forming receiver and to receive the sheaves one by one as they are delivered thereto by the discharge-arms of the binder and thence carry the sheaves successively up and empty them into the upper side of the receiver, a set of compound levers on which said sheaf-carrier is mounted to enable it to move in the destined path, mechanism connecting said compound levers with the knotter-shaft of the binder to operate the same, mechanism connecting the shaft of said receiver operatively with the knotter-shaft of the harvester, periodically-operated trip mechanism connected with said set of compound levers which operate the sheaf-carrier and arranged to throw said receiver-operating mechanism in and out of gear at stated intervals for setting up the shock of grain whenever a certain predetermined number of sheaves have been delivered into said receiver, and mechanism connected with the mechanism operating said shock-forming receiver for opening and closing said butter-plate at the proper time. In connection with these devices I may also mention a spring-door which closes the upper side of the shock-forming receiver during the depression of the same to set up the shock, but which is automatically opened by striking against a projecting arm of the frame while it is receiving the sheaves, and which device forms an important though not an essential element of my invention.

My invention further consists in the particular combinations and constructions hereinafter described, and more particularly set forth in the claims.

I have illustrated my improved grain-shocking apparatus in the accompanying drawings, wherein—

Fig. 8 is a longitudinal central section to illustrate the trip mechanism for the receiver and taken on the line 8 8 of Fig. 6. Fig. 9 is a transverse sectional elevation through the same, taken on the line 9 9 of Fig. 8.

The same numerals of reference denote like parts in all the figures of the drawings.

In the drawings, referring first to the main views, Figs. 1 to 5, inclusive, 10 designates the frame of a self-binding harvester of any ordinary or preferred type, which has an elevator 11, a binder-table 12, a main wheel 13, and a sprocket-gear 14, mounted on the shaft thereof, which last is connected by a chain 15 with the sprocket-pinion 16, loosely turning on a short counter-shaft 17 and thrown into operative engagement therewith by any suitable clutch mechanism 18, which need not here be further described, as it forms no part of my invention. On the opposite or right-hand end of the counter-shaft 17 is mounted a bevel-gear 19, which meshes with the bevel-pinion 20 on the main operating-shaft 21 of the harvester, whose forward end has a crank-disk 22 and pin 23, to which is connected the pitman which drives the cutter-blade, while its rear end has fixed thereon a sprocket-wheel 24, driving the elevator-chain 25 and through it the other operative parts of the binding mechanism, including the secondary shaft 26, carrying the sprocket-wheel 27, over which the chain 25 passes, and extending from rear to front of the binder, beneath the table thereof, and having on its forward end another sprocket-gear 28, which is connected by a sprocket-chain 29 with a large sprocket-wheel 30 on the knotter-shaft 31. Immediately beneath the binder-table 12 is located the needle-shaft 32, carrying the needle 33, which is operated from the shaft 31 by a crank-pin 34, projecting eccentrically from one of the spokes of the sprocket-gear 30, and a rock-arm 35 on the needle-shaft, connected with the crank-pin 34 by a link 36, so as to oscillate the needle as the knotter-shaft revolves. The chain 29 is carried over a small idle wheel or roller 36$^a$ to enable it to clear the end of the needle-shaft and other operating mechanism. The binder is shown as having the customary butter-board 37, which swings laterally upon the table against the butts of the grain, the drop-board 38 at the lower end of the binder-table, which retains the sheaves until pushed off, and a set of delivery-arms 39, which are fixed to and revolve with the knotter-shaft and push the sheaves as fast as they are bound off the end of the binder-deck; but some of the usual parts of a binder are not shown in the drawings, as these form no part of my invention and are omitted for the sake of clearness.

Bolted to the main frame 10 of the harvester is the shocker-frame, which comprises the two horizontal standards 40 and 41, whose outer ends are secured together by a cross-rod 42. These rods are also connected at intermediate points by parallel beams 43 and 44, in which is journaled transversely at or near the center a short horizontal shaft 45, which is the operating-shaft for the receiver to be hereinafter referred to. This shaft is shown in sectional detail in Fig. 8, and it has surrounding the same for nearly its entire length a sleeve 46, which is fixed thereto by diametrical pins 47. On the inner or left-hand end of this shaft is loosely mounted a bevel-gear 48, which meshes with a bevel-pinion 49, keyed to the main operating-shaft 21, and is therefore in continuous rotation while the harvester is advancing. Between the wheel 48 and the beam 43 is mounted a cylindrical block 50, which is secured to the shaft by one of the pins 47, and at one side thereof it has pivotally mounted thereon a trip-pawl 51 upon a pin 52, projecting from the side of the block. This arrangement is shown more clearly in Fig. 9, wherein it is seen that the pawl 51 is free to rotate through a certain arc about its pivot. The trip-pawl 51 has an upstanding arm 53, which is adapted to be engaged by the butt-end of a trip-lever 54, pivoted on an upstanding bearing-bracket 55, fixed to the standard 40 of the shocker-frame, and when engaged by this lever the pawl 51 is held, as shown in Fig. 9, in upright position. When this lever is caused to be tilted, so as to disengage the arm 53 of the pawl, the latter is overbalanced, so as to fall into the position shown in dotted lines in Fig. 9, wherein the heel 56 of the pawl strikes against the sleeve 46, and the nose 57 is thereby tilted up, so as to become engaged with one of three pins 58, which project from the rear or right-hand face of the bevel-gear 48; but when the pawl is held upright, as in full lines in Fig. 9, it will be seen that the pins rotate without engaging it, because the arm 53 of the pawl is offset to the right, so as to clear these pins. As soon, therefore, as the pawl is disengaged by the trip-lever 54 it becomes engaged with one of the pins of the rotating gear 48, and thereby the shaft 45 is set in motion and rotated.

Figures 5, 10:
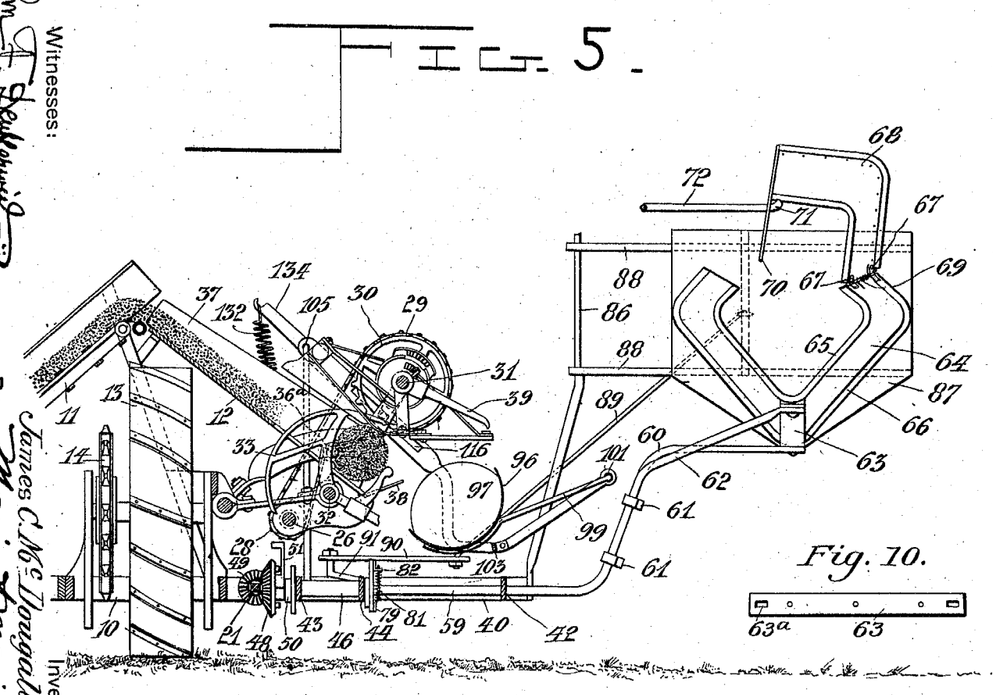
Fig. 5 is a transverse central sectional elevation of the same looking toward the front.
Fig. 10 is a plan view of a bar connecting the receiver with its supports.
Figure 6:
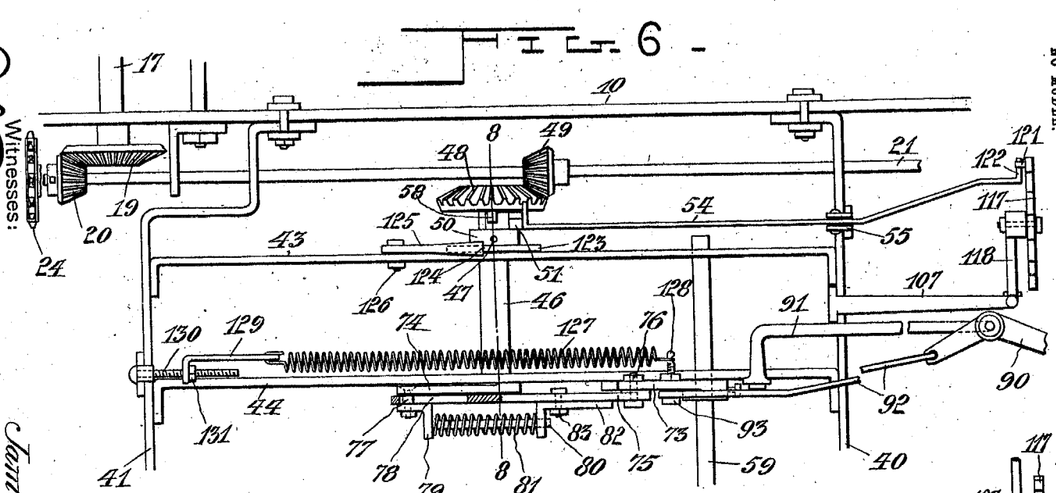

Mounted transversely in the shocker-frame is a shaft 59, which is arranged forwardly of the center of the binder and at its outer or right-hand end is bent upwardly in the form of a supporting-arm 60. To the arm 60, midway thereof, is clamped by straps 61 an auxiliary bracket-arm 62, and the ends of the arms 60 and 62 which project horizontally beyond their upright portions are connected together adjustably by a plate 63, having slots 63$^a$ therein, as shown in Fig. 10. On the plate 63 is supported the shock-forming receiver 64, which is preferably of roughly conical or pyramidical form, having both ends open and held in shape by the angle-iron frames 65 and 66. As shown, the larger end of the receiver is directed forwardly, and the lower side thereof slopes downwardly. The upper side is open and has hinged thereto at 67 a closure-door 68, which is kept normally closed by the force of a torsion-spring 69, mounted on the pintle of the hinge. The free side of the door 68 is provided with a long rearwardly-projecting arm 70, which as the receiver is brought up to its raised or horizontal position engages with the hooked extremity 71 of a horizontally-extending arm 72, which projects from the frame and is secured thereto, so as to hold the door 68 open during the formation of the shock. The receiver is also preferably of four-sided form, being destined to receive eight sheaves at a time and to press them into a four-sided shock, four of the sheaves being pressed into the corners of the receiver, while the other four occupy intermediate positions. When the shaft 59 is turned forwardly, so as to lower the receiver into the position shown in dotted lines in Fig. 3, the door automatically closes, because the arm 70 is raised out of engagement with the arm 72.

Figures 3, 6:
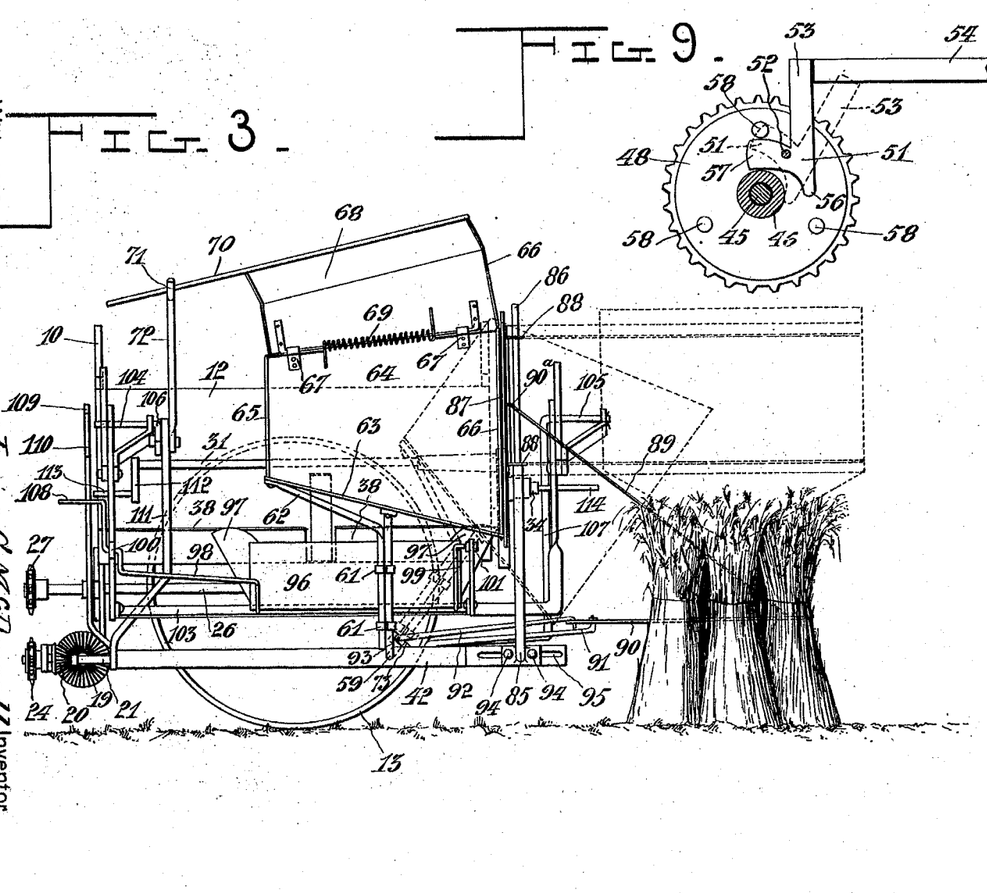
Fig. 3 is a side elevation of the same.
Fig. 6 is a plan view of the operating mechanism for the shock-forming receiver on an enlarged scale.
Figure 4:
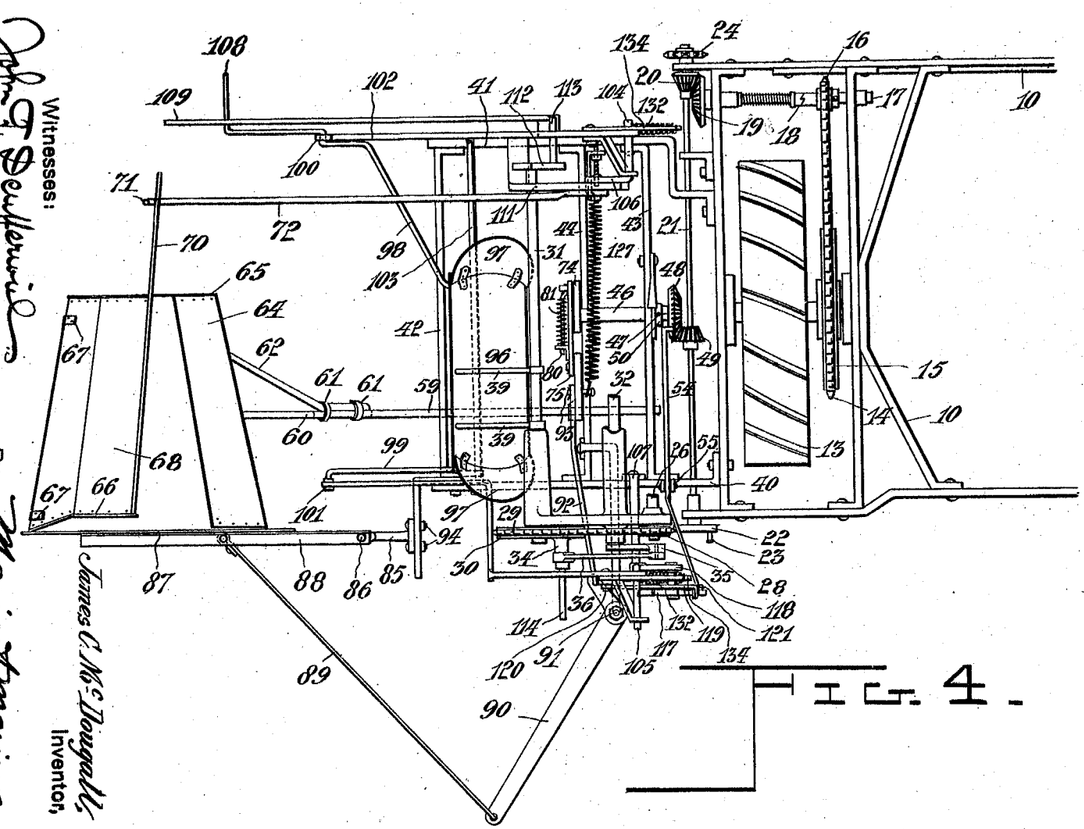
Fig. 4 is a plan view of the same.
Figure 7:
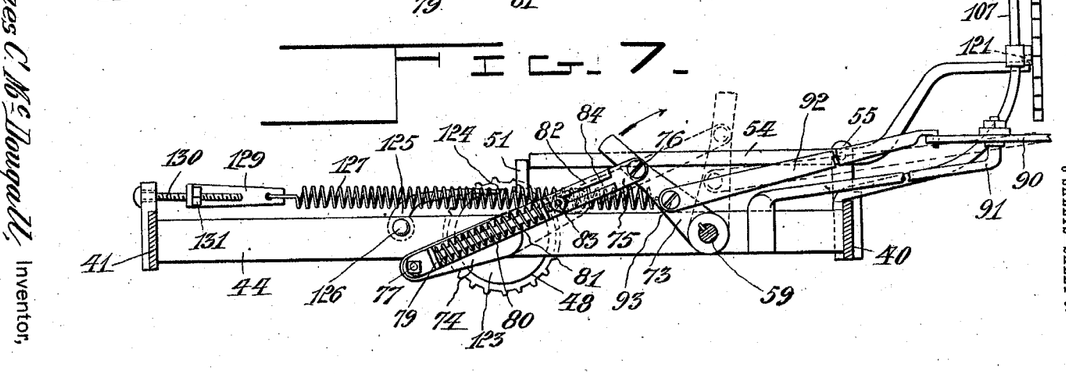
Fig. 7 is a side elevation of the same.

The receiver-shaft 59 is operatively connected with the crank-shaft 45 hereinbefore described, as follows: The shaft 59 has keyed thereto, as shown in Fig. 7, a rock-arm 73, which is in line with a crank 74, secured to the end of the shaft 45. These two are connected by a link 75, which is pivotally connected to the arm 73 by a pivot-pin 76 and to the crank-pin 77 of the crank 74 by a longitudinal slot 78, so that the crank-pin has a sliding movement with relation to the link 75. The crank-pin 77 is shouldered, as shown in Fig. 6, and secured to its outer end is a bracket 79, having a pin 80, which is surrounded by a strong compression-spring 81. A second bracket 82 is adjustably secured to an intermediate point of the link 75 by means of a bolt 83, which runs in a slot 84 of the bracket, and this bracket has a hole through which the pin 80 reciprocates, and it supports the end of the spring 81. It will be seen that this arrangement serves to give a resilient connection between the operating-shaft of the binder and the shock-forming movements of the receiver in order to conform with the unevenness of the ground, so that the receiver will not be forced against the ground so hard as to cause it to be bent or the apparatus to become deranged.

On the forward outer end of the shocker-frame is bolted an upright post 85, whose upper end is reduced to form a pintle 86, on which is pivoted the door or butter-plate 87 by means of its horizontal angle-iron beams 88. This butter-plate is adapted to close the forward open end of the shock-forming receiver to prevent the sheaves from falling therefrom, and, further, to abut against the ends of the sheaves to cause them to assume an even position. This door is opened and closed by a link-rod 89, which engages a ring 90ª on the butter-plate and whose other end is pivotally secured to the forwardly-extending arm of a bell-crank lever 90, pivoted on a short upright post 91, secured to the shocker-frame. This lever vibrates in a horizontal plane, and its other arm is connected by a link 92 to a pivot-pin 93, fixed at an intermediate point in the rock-arm 73. By this arrangement it will be seen that the bell-crank lever 90, and hence the butter-plate 87, is adapted to have a simultaneous oscillation with the shock-receiver, so that upon the forward movement of the rock-arm 73 the lever 90 is swung around so as to open or swing forwardly the butter-plate out of the way of the receiver as it descends to the ground to set up a shock, and, conversely, when the rock-arm is swung back by the retreating movement of the crank 74 the butter-plate is likewise swung back against the end of the receiver. It will be observed, moreover, from Fig. 3 that the upright post 85, which carries the butter-plate, is secured by bolts 94 in a slot 95 on the cross-piece 42 of the frame, whereby said butter-board may be adjusted to occupy a plane at a suitable distance from the end of the receiver corresponding to the length of the grain which is being cut.

Figures 1, 2:
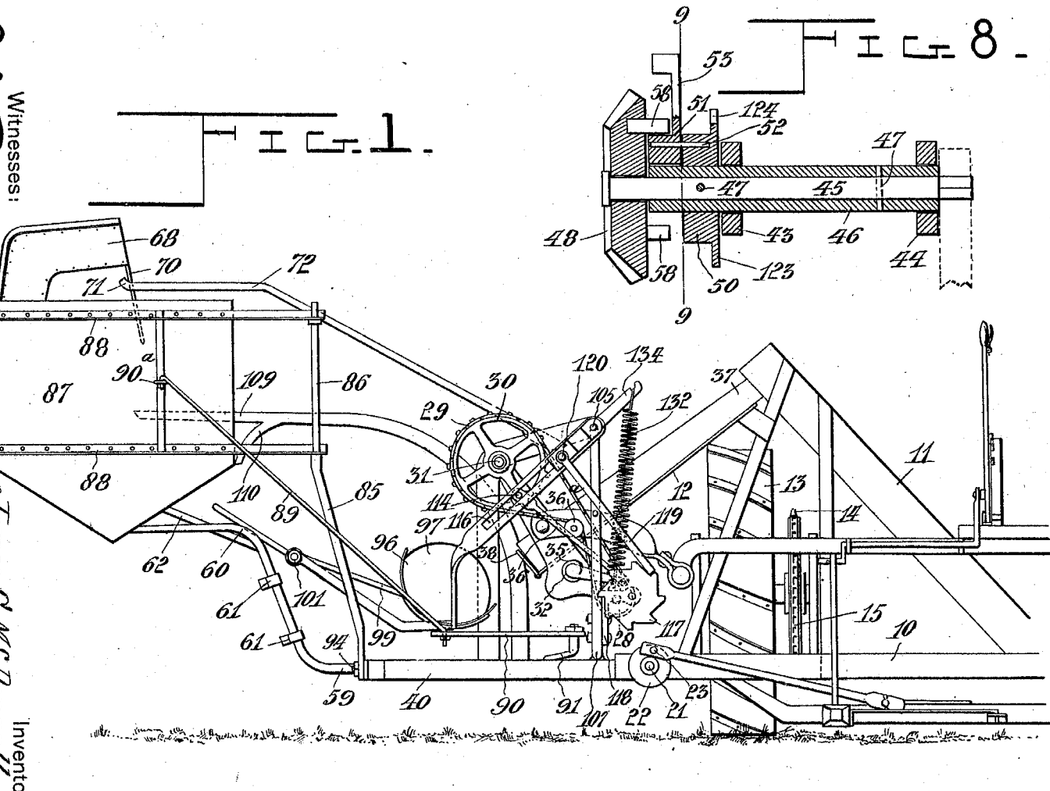
Figure 1 is a front elevation of a self-binding harvester having my improved apparatus mounted thereon.
Fig. 2 is a rear elevation of the same.
Figure 2:
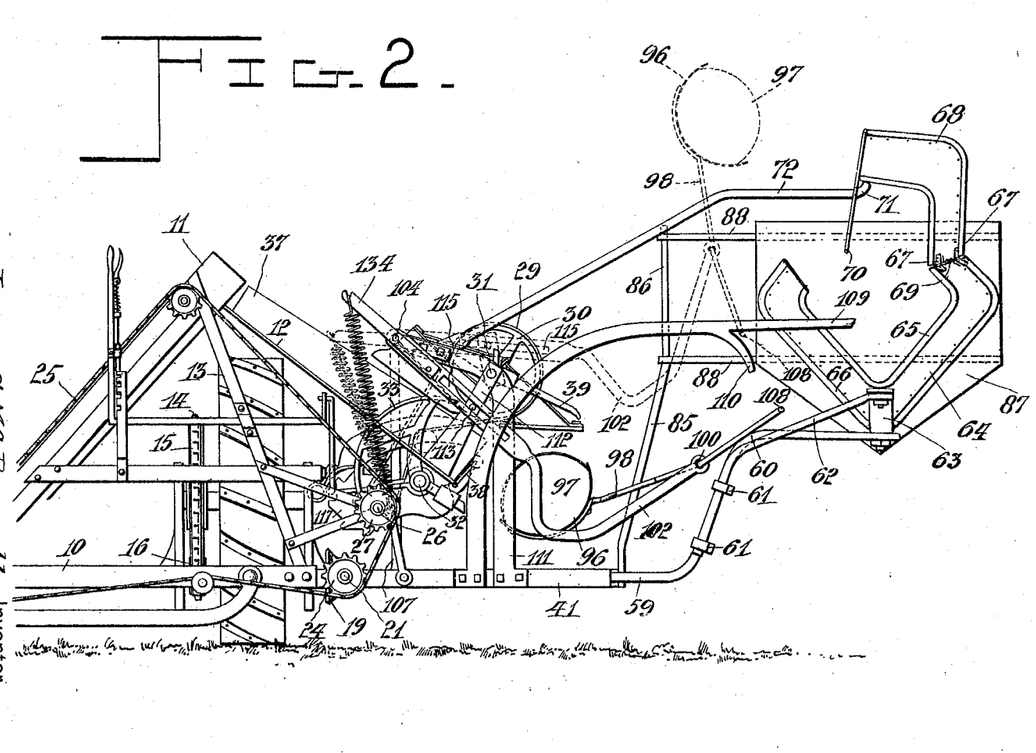

In order to provide for placing the sheaves successively in the receiver as they are delivered by the discharge-arms 39 from the end of the binder-deck, I provide a sheaf-carrier 96, which is in the shape of a semicircular trough having converging end plates 97, this carrier being of about the proper length for the grain-sheaves and the end plates 97 causing the sheaves to be each laid in its proper place in the middle. The sheaf-carrier 96 is supported on the ends of two swinging arms 98 and 99, which are pivoted, respectively, in the projecting ends 100 and 101 of a lever-frame 102, consisting of two slotted transverse arms joined by a longitudinal member 103 and pivoted at their inner ends on pintles 104 and 105, formed on the ends of brackets 106 on upstanding posts 107, secured to the opposite ends of the shocker-frame. When the frame 102 is resting in its lowest position, which is the normal position, the pivoted sheaf-carrier 96 rests on the cross-bar 103, and in this position it faces the end of the binder-table, as illustrated in Figs. 1 and 5, so as to be ready to receive a sheaf therefrom. When, however, the frame 102 is raised and turned about its pivots, the arm 98, which carries a rectangularly-projecting finger 108, extending beyond the pivot-point 100 strikes against a horizontally-projecting overhanging arm 109, secured to the shocker-frame, so as to cause the sheaf-carrier to be rotated about its pivot-points 100 and 101 until it reaches the position shown in dotted lines in Fig. 2, in which the finger 108 abuts against the downwardly-extending tongue 110, arranged at the proper point of the arm 109, so as to prevent the tipping movement from proceeding further and the sheaf-carrier from falling over. In this position the sheaf carried in the carrier will be tumbled out and allowed to drop into the sheaf-receiver through the open door 68 thereof. Then on again lowering the lever-frame 102 the carrier is returned to its former position ready to receive the next sheaf.

The mechanism which I use for operating the lever-frame 102 to oscillate it alternately up and down is as follows: The knotter-shaft 31 instead of being arranged to overhang the binder-deck and journaled only at one end is carried clear across the latter, and its rear end is mounted in a bearing 111, formed on the shocker-frame, and on the rear end of the shaft beyond the bearing 111 is fixed a crank 112, which carries a long crank-pin 113, this being disposed in the same axial line with the crank-pin 34, which latter is also prolonged in a reduced extension 114, and the two pins 113 and 114 engage in slots 115 and 116 in the side bars of the frame 102, so that the rotation of the knotter-shaft alternately raises and lowers this frame about its pivots. It will be seen that the crank-pins 113 and 114 are made actually of considerable length, so as to permit the longitudinal shifting of the binder-table and binding mechanism in the usual manner without causing these pins to disengage with their respective slots in the members of the frame 102. At every revolution, therefore, of the knotter-shaft the frame 102 will be raised, and consequently the sheaf-carrier will raise the discharged sheaf and deliver it into the receiver and thereafter will descend to its place again ready for another sheaf as soon as the discharge-arms have completed their revolution.

The connection between the receiver and the sheaf-carrier is such as to cause the former to automatically dump its load and set up the shock after a predetermined number of sheaves have been delivered thereto, and the present machine is adapted to form shocks of eight sheaves each. To this end I provide a ratchet-wheel 117, having eight teeth corresponding to the number of sheaves which go to form a shock, and this wheel is pivoted on a bracket 118, secured to the side of the post 107. With this wheel coöperates a pawl-rod 119, which is pivoted to the front side arm of the frame 102, as at 120, and the free end of this rod drags along on the teeth of the ratchet-wheel and advances the same by one tooth at each downward oscillation of the sheaf-carrier. This wheel 117 has on its rear face a pin 121 at one point of its periphery, which engages with a finger 122, formed on the forwardly-projecting end of the trip-rod 54, hereinbefore described in connection with the trip mechanism shown in Fig. 8, the connections as a whole being illustrated most clearly in Figs. 6 and 7. It will be seen, therefore, that at each revolution of the wheel 117—that is to say, after eight sheaves have been successively delivered by the carrier to the receiver—the pin 121 will strike the finger 122 and raise the opposite end of the pawl-rod 54, whereby the pawl 51 is caused to fall and become engaged with one of the pins 58 on the rear face of the continuous rotating bevel-gear 48, thus rotating it and setting the shock-forming mechanism in motion. After one revolution has been performed by the shaft 45 the pawl 53 will again become engaged with the lever 54, which has meantime been dropped, and will be thereby pushed out of engagement with the pin 58, and the receiver will remain stationary until the ratchet-wheel 117 has completed another revolution, when the same cycle of operations will be repeated.

In order to prevent any possible back motion of the operating mechanism for the receiver-shaft, the block 50 is provided with an annular flange 123, which at one point thereof has a radial jog 124 therein, which latter is engaged when the receiver is in its normal position—that is to say, at the upper end of its stroke—by the pawl 125, pivoted to the shocker-frame by a bolt 126. In order further to counterbalance the weight of the moving receiver, I provide a retractile spring 127, one end of which is hooked over a pin 128, forming the reduced end of the pin 93, and the other end is hooked into a bar 129, adjustably secured to the frame by an adjusting-screw 130 and nut 131, whereby the tension of the spring 127 may be adjusted to the proper amount to hold the receiver resiliently in its upright position. When the receiver is empty, it will therefore have a tendency to fly back into this position, and thus aid the power imparted to it by the operating mechanism; but when the receiver is full of sheaves and ready to descend the weight thereof will overbalance the spring 127, and thus in this position also it will assist the motion of the operating mechanism.

I preferably further counterbalance and equalize the motion of the oscillating frame 102 by means of a pair of springs 132, which are hooked into rearwardly-extending arms 134 at the sides of the frame and whose other ends are secured to stationary parts of the shocker-frame, so as to balance the weight of the sheaf-carrier and the overhanging parts of the frame 102.

It will be understood that in the descending motion of the receiver it is operated very quickly to set up the shock and return to its place again before the harvester has advanced far enough to permit the edge of the receiver to strike the top of the shock and tip it over before it has cleared the latter. In former machines built by me the longitudinal beams of the shocker-frame which carried the receiver-shaft were made slidable in a front-to-rear plane, so as to yield by a certain amount in order to allow the receiver time to rise to its position before clearing the shock; but this has been found unnecessary, as by proper design of the parts the return movement of the carrier can, as stated, be made quicker than the advance movement of the harvester as a whole, and therefore this portion of the device has not been shown in the present application.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A grain-shocking attachment for self-binding harvesters, comprising a shock-forming receiver mounted to rotate on a horizontal axis, an oscillating carrier arranged to deliver the sheaves singly into said receiver from the table of the binder, means controlled by the oscillation of said sheaf-carrier for causing said receiver to be automatically rotated about its axis to set up the shock and subsequently returned to its normal position after a predetermined number of sheaves have been delivered to it by said carrier, a butter-plate pivoted on a vertical axis opposite the end of said receiver and adapted to strike and even the butts of the grain-sheaves, and a connection between said butter-plate and the operating mechanism for the receiver to cause the same to be swung back at each downward motion of the receiver, and swung forward into its normal position again at each return movement of the receiver.

2. A grain-shocking attachment for self-binding harvesters, comprising a rotatably-mounted shock-forming receiver adapted to support sheaves, means for causing the same to be periodically rotated through a sufficient arc to set up a shock upon the ground, a carrier adapted to receive the sheaves successively from the binder-table and deliver them one by one to said receiver, a pivoted lever-frame on which said carrier is pivotally mounted, and a crank on the knotter-shaft of the binder mechanically connected with said lever-frame whereby said carrier is caused to perform one complete cycle of movement for each revolution of the knotter-shaft.

3. A grain-shocking attachment for self-binding harvesters, comprising a shocker-frame secured to the frame of the harvester and projecting outwardly therefrom, a horizontal laterally-extending receiver-shaft having an upwardly-turned end, a bracket carried on said end, a shock-forming receiver carried on said bracket, means for periodically rotating said receiver through an arc of approximately a right angle, means for closing the forward open end of said receiver while the shock is being formed, means for delivering the sheaves successively into said receiver from the binder, a door on one side of said receiver, and means for automatically retaining said door in open position when said receiver is raised.

4. In a grain-shocking attachment for self-binding harvesters, the combination of a shock-forming receiver, a horizontal shocker-frame extending laterally from the main frame of the binder, an oscillating receiver-shaft rotatably mounted on said frame, an upstanding supporting-bracket formed on the end of said shaft and on which said receiver is mounted, a rock-arm mounted on said shaft, a counter-shaft parallel to said receiver-shaft, a crank fixed thereto and in line with said rock-arm, a link connecting said crank with said rock-arm, and means for throwing said shaft temporarily into gear with the main operating-shaft of the harvester.

5. In a grain-shocking attachment for self-binding harvesters, the combination of a shock-forming receiver, a horizontal shocker-frame extending laterally from the main frame of the binder, an oscillating receiver-shaft rotatably mounted on said frame, an upstanding supporting-bracket formed on the end of said shaft and on which said receiver is mounted, a rock-arm mounted on said shaft, a counter-shaft parallel to said receiver-shaft, a crank fixed thereto and in line with said rock-arm, a link connecting said crank with said rock-arm, and means for throwing said counter-shaft temporarily into gear with the main operating-shaft of the harvester, in combination with a butter-plate mounted to swing on a vertical axis opposite the open front end of said receiver, and a link-and-lever connection between said butter-plate and said rock-arm, whereby the forward movement of said rock-arm and receiver causes said butter-plate to be swung forward, and vice versa, substantially as described.

6. In a grain-shocking attachment for self-binding harvesters, the combination of a shock-forming receiver, means for automatically oscillating the same periodically at the completion of each shock, a lever-frame 102 pivotally mounted on the frame of the machine, means for automatically oscillating said lever-frame from the knotter-shaft of the binder, a sheaf-carrier carried on the ends of a pair of swinging arms, said swinging arms being pivoted in the ends of said lever-frame, one of said swinging arms having an outwardly-projecting finger 108, and an overhanging arm 109 projecting from the frame and adapted to be engaged by said finger 108, whereby said sheaf-carrier is raised and tipped by the rising movement of said lever-frame to deliver the sheaf contained therein to said receiver, substantially as described.

7. A grain-shocking attachment for self-binding harvesters, comprising a horizontal laterally-projecting shocker-frame secured to the main frame of the harvester, a horizontal laterally-extending receiver-shaft journaled therein and having an upstanding end, a receiver mounted on said upstanding end, a rock-arm mounted on said shaft, a short counter-shaft 45 journaled to rotate in said shocker-frame parallel to said receiver-shaft, a bevel-gear loosely mounted on said counter-shaft, a second bevel-gear keyed to the main operating-shaft of the machine and intermeshing with said first gear to keep it in continual operation during the operation of the harvester, clutch mechanism between said loose bevel-gear and the shaft on which it is mounted, a crank mounted on the other end of said counter-shaft, a link connecting said crank with said rock-arm, whereby to oscillate the latter backwardly and forwardly by the rotation of said crank, a sheaf-carrier adapted to reciprocate between the binder-table and the receiver to deliver the sheaves successively from the former to the latter, a ratchet-wheel, a pawl mechanism engaging said ratchet-wheel and operated by the reciprocation of said sheaf-carrier, a trip-bar 54 arranged to be engaged by said ratchet-wheel and oscillated thereby at each revolution thereof, and connections between said trip-bar and said clutch mechanism, whereby said counter-shaft is thrown temporarily into engagement with said loose bevel-gear once at each revolution of said ratchet-wheel, substantially as described.

8. A grain-shocking attachment for self-binding harvesters, comprising a horizontal laterally-projecting shocker-frame secured to the main frame of the harvester, a horizontal laterally-extending receiver-shaft journaled therein and having an upstanding end, a receiver mounted on said upstanding end, a rock-arm mounted on said shaft, a short counter-shaft 45 journaled to rotate in said shocker-frame parallel to said receiver-shaft, a bevel-gear loosely mounted on said counter-shaft, a second bevel-gear keyed to the main operating-shaft of the machine and intermeshing with said first gear to keep it in continual operation during the operation of the harvester, clutch mechanism between said loose bevel-gear and the shaft on which it is mounted, a crank mounted on the other end of said counter-shaft, a link connecting said crank with said rock-arm, whereby to oscillate the latter backwardly and forwardly by the rotation of said crank, a sheaf-carrier adapted to reciprocate between the binder-table and the receiver to deliver the sheaves successively from the former to the latter, a ratchet-wheel, a pawl mechanism engaging said ratchet-wheel and operated by the reciprocation of said sheaf-carrier, a trip-bar 54 arranged to be engaged by said ratchet-wheel and oscillated thereby at each revolution thereof, connections between said trip-bar and said clutch mechanism, whereby said counter-shaft is thrown temporarily into engagement with said loose bevel-gear at each revolution of said ratchet-wheel, a butter-plate swinging on a vertical axis at the front open side of said receiver, a bell-crank lever pivoted to turn in the frame of the machine, a link connecting said butter-plate with one end of said bell-crank lever, and a second link connecting the other end of said bell-crank lever to said rock-arm, whereby said butter-plate is swung outwardly out of the way at each forward oscillation of the receiver, substantially as described.

9. In a grain-harvesting machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, and means for engaging the said finger on the upward movement of said lever-frame to rotate said sheaf-carrier about its pivots in the end of said lever-frame, whereby said carrier is adapted to deliver the sheaf received from the binder-table into said receiver, substantially as described.

10. In a grain-shocking machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, means for engaging the said finger on the upward movement of said lever-frame to rotate said sheaf-carrier about its pivots in the end of said lever-frame, whereby said carrier is adapted to deliver the sheaf received from the binder-table into said receiver, and means for periodically rotating said receiver about an eccentric axis to set up the shock of sheaves contained therein upon the ground, substantially as described.

11. In a grain-shocking machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, means for engaging the said finger on the upward movement of said lever-frame to rotate said sheaf-carrier about its pivots in the end of said lever-frame, whereby said carrier is adapted to deliver the sheaf received from the binder-table into said receiver, means for periodically rotating said receiver about an eccentric axis to set up the shock of sheaves contained therein upon the ground, a door covering the upper side of said receiver and hinged at one side of the opening thereof, means for resiliently holding said door in closed position, and means for causing said door to be automatically opened when said receiver is raised to horizontal position and closed again when said receiver is rotated to set up the shock, substantially as described.

12. In a grain-shocking machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, means for engaging the said finger on the upward movement of said lever-frame to rotate said sheaf-carrier about its pivots in the end of said lever-frame, whereby said carrier is adapted to deliver the sheaf received from the binder-table into said receiver, means for periodically rotating said receiver about an eccentric axis to set up the shock of sheaves contained therein upon the ground, a door closing the upper side of said receiver and pivoted thereto at one side of the opening, a spring mounted on the pintle of said door and tending to hold it resiliently in closed position, a rearwardly-extending arm 70 secured to the free edge of said door, and a projecting arm adapted to be engaged by said arm 70 upon the return of the receiver to its normal raised position to open said door and to be disengaged by said arm 70 when said receiver is rotated forwardly to set up a shock, whereby to close said door, substantially as described.

13. In a grain-shocking machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, means for engaging the said finger on the upward movement of said lever-frame to rotate said sheaf-carrier about its pivots in the end of said lever-frame, whereby said carrier is adapted to deliver the sheaf received from the binder-table into said receiver, means for periodically rotating said receiver about an eccentric axis to set up the shock of sheaves contained therein upon the ground, a door covering the upper side of said receiver and hinged at one side of the opening thereof, means for resiliently holding said door in closed position, means for causing said door to be automatically opened when said receiver is raised to horizontal position and closed again when said receiver is rotated to set up the shock, a butter-plate swinging about a vertical axis and adapted to strike the butts of the sheaves, and means for forwardly and backwardly rotating said butter-plate with each forward and backward rotation of said receiver, whereby to strike and adjust the butts of the sheaves while the shock is being formed and to clear said receiver while the shock is being set up.

14. In a grain-shocking machine, the combination of a self-binder having a knotter-shaft extending from end to end of the machine, a crank-arm formed on each end of said knotter-shaft, a lever-frame 102 pivoted on elevated pintles at the front and rear ends of the binder-table and having slots therein, crank-pins on the ends of said crank-arms engaging in said slots, a shock-forming receiver, a sheaf-carrier having horizontal swinging arms secured to each end thereof, said swinging arms being pivoted in the laterally-projecting ends of said lever-frame, a projecting finger 108 formed on one of said swinging arms, means for engaging the said finger on the upward movement of said lever-frame to rotate said sheaf-carrier about its pivots in the end of said lever-frame, whereby said carrier is adapted to deliver the sheaf received from the binder-table into said receiver, means for periodically rotating said receiver about an eccentric axis to set up the shock of sheaves contained therein upon the ground, a door covering the upper side of said receiver and hinged at one side of the opening thereof, means for resiliently holding said door in closed position, means for causing said door to be automatically opened when said receiver is raised to horizontal position and closed again when said receiver is rotated to set up the shock, a vertical post rising from the outer front side of the shocker-frame, and having a vertical pintle at its upper end, a butter-plate swinging on said pintle, a bell-crank lever pivotally mounted on the frame of the machine, a link connecting one arm of said bell-crank lever with said butter-plate, and a second link connecting the other arm of said bell-crank lever with the operating-shaft of said receiver, whereby they are caused to be simultaneously rotated forward and backward, substantially as described.

15. A grain-shocking attachment for self-binding harvesters, comprising a shocker-frame secured to the main frame of the harvester and extending laterally therefrom beneath the binder-table, a receiver-shaft rotatably mounted in said shocker-frame and extending in a lateral direction, a bent bracket-arm on the end of said shaft, a rock-arm secured on said receiver-shaft, a counter-shaft mounted in the shocker-frame and parallel to said receiver-shaft, a link connecting said rock-arm and said counter-shaft, whereby to cause said receiver-shaft to be oscillated on the rotation of said counter-shaft, said link having a sliding connection with one of the pieces which it connects, and a spring interposed between the piece and the link whereby to provide a yielding connection between said counter-shaft and rock-arm, substantially as described.

16. A grain-shocking attachment for self-binding harvesters, comprising a shocker-frame secured to the main frame of the harvester and extending laterally therefrom beneath the binder-table, a receiver-shaft rotatably mounted in said shocker-frame and extending in a lateral direction, a bent bracket-arm on the end of said shaft, a receiver mounted on said bracket-arm, a rock-arm secured on said receiver-shaft, a counter-shaft mounted in the shocker-frame and parallel to said receiver-shaft, a link connecting said rock-arm and said shaft, whereby to cause said receiver-shaft to be oscillated on the rotation of said counter-shaft, said link having a sliding connection with one of the pieces which it connects, a spring interposed between the piece and the link whereby to provide a yielding connection between said counter-shaft and rock-arm, and a tension-spring connecting said rock-arm to a point at the rear of the frame and adjustable to such a tension that when said receiver is loaded with a shock of grain it overbalances the tension of said spring and assists its forward motion, but when said shock has been set up, said spring overbalances the weight of said receiver and assists its return to normal position, substantially as described.

17. A grain-shocking attachment for self-binding harvesters, comprising a shocker-frame bolted to the main frame of the harvester beneath the binding-table thereof and extending laterally therefrom, a horizontal laterally-extending receiver-shaft journaled in said frame near the forward end thereof, a bracket-arm formed on the end of said shaft and rising above the level of the latter, a pyramid or cone shaped shock-forming receiver mounted on said bracket-arm and open at both ends and adapted to receive the sheaves and to be oscillated through approximately a right angle from the upright to the forward horizontal position, a rock-arm mounted on the shaft of said receiver and adapted to oscillate said shaft to operate the receiver, a short counter-shaft parallel to said receiver-shaft and journaled in said shocker-frame, a crank mounted on said counter-shaft opposite said rock-arm, a resilient link connection between said crank and rock-arm, a bevel-gear loosely mounted on the end of said counter-shaft, a second bevel-gear keyed to the main operating-shaft of the harvester and engaging said first-mentioned gear, a clutch mechanism adapted to connect said first-mentioned gear to the shaft on which it is mounted, a trip mechanism adapted to operate said clutch mechanism, and means for automatically operating said trip mechanism to cause the engagment of said clutch mechanism after a predetermined number of sheaves have been delivered into said receiver and for disengaging said clutch mechanism after said counter-shaft has made one revolution, substantially as described.

18. A grain-shocking attachment for self-binding harvesters, comprising a shocker-frame bolted to the main frame of the harvester beneath the binding-table thereof and extending laterally therefrom, a horizontal laterally-extending receiver-shaft journaled in said frame near the forward end thereof, a bracket-arm formed on the end of said shaft and rising above the level of the latter, a pyramid or cone shaped shock-forming receiver mounted on said bracket-arm and open at both ends and adapted to receive the sheaves and to be oscillated through approximately a right angle from the upright to the forward horizontal position, a rock-arm mounted on the shaft of said receiver and adapted to oscillate said shaft to operate the receiver, a short counter-shaft parallel to said receiver-shaft and journaled in said shocker-frame, a crank mounted on said counter-shaft opposite said rock-arm, a resilient link connection between said crank and rock-arm, a bevel-gear loosely mounted on the end of said counter-shaft, a second bevel-gear keyed to the main operating-shaft of the harvester and engaging said first-mentioned gear, a clutch mechanism adapted to connect said first-mentioned gear to the shaft on which it is mounted, a trip mechanism adapted to operate said clutch mechanism, means for automatically operating said trip mechanism to cause the engagement of said clutch mechanism after a predetermined number of sheaves have been delivered into said receiver and for disengaging said clutch mechanism after said counter-shaft has made one revolution, a butter-plate pivoted on a vertical axis and adapted to strike against the butts of the sheaves in the receiver and to form a closure for the lower end of said receiver, and mechanical connections between said butter-plate and the receiver-shaft, whereby said butter-plate is swung open upon the forward movement of said receiver and swung back on the backward movement of said receiver, substantially as described.

19. A grain-shocking attachment for self-binding harvesters, comprising a shocker-frame bolted to the main frame of the harvester beneath the binding-table thereof and extending laterally therefrom, a horizontal laterally-extending receiver-shaft journaled in said frame near the forward end thereof, a bracket-arm formed on the end of said shaft and rising above the level of the latter, a pyramid or cone shaped shock-forming receiver mounted on said bracket-arm and open at both ends and adapted to receive the sheaves and to be oscillated through approximately a right angle from the upright to the forward horizontal position, a rock-arm mounted on the shaft of said receiver and adapted to oscillate said shaft to operate the receiver, a short counter-shaft parallel to said receiver-shaft and journaled in said shocker-frame, a crank mounted on said counter-shaft opposite said rock-arm, a resilient link connection between said crank and rock-arm, a bevel-gear loosely mounted on the end of said counter-shaft, a second bevel-gear keyed to the main operating-shaft of the harvester and engaging said first-mentioned gear, a pawl-block 50 keyed to said counter-shaft, a pawl 51 pivotally mounted thereon, a series of pins projecting from the rear face of said bevel-gear and adapted to be engaged by said pawl when the latter is permitted to fall into oblique position, a trip-lever 54 having an end adapted to engage an upstanding portion of said pawl to hold it in upright position out of engagement with said pins, and means for periodically raising said trip-lever to disengage said pawl and immediately dropping it again after a predetermined number of sheaves has been delivered to said receiver, whereby said counter-shaft is caused to perform one revolution and said receiver to be oscillated to set up the shock and returned to its original position, substantially as described.

20. A grain-shocking attachment for self-binding harvesters, comprising a shocker-frame bolted to the main frame of the harvester beneath the binding-table thereof and extending laterally therefrom, a horizontal laterally-extending receiver-shaft journaled in said frame near the forward end thereof, a bracket-arm formed on the end of said shaft and rising above the level of the latter, a pyramid or cone shaped shock-forming receiver mounted on said bracket-arm and open at both ends and adapted to receive the sheaves and to be oscillated through approximately a right angle from the upright to the forward horizontal position, a rock-arm mounted on the shaft of said receiver and adapted to oscillate said shaft to operate the receiver, a short counter-shaft parallel to said receiver-shaft and journaled in said shocker-frame, a crank mounted on said counter-shaft opposite said rock-arm, a resilient link connection between said crank and rock-arm, a bevel-gear loosely mounted on the end of said counter-shaft, a second bevel-gear keyed to the main operating-shaft of the harvester and engaging said first-mentioned gear, a pawl-block 50 keyed to said counter-shaft, a pawl 51 pivotally mounted thereon, a series of pins projecting from the rear face of said bevel-gear and adapted to be engaged by said pawl when the latter is permitted to fall into oblique position, a trip-lever 54 having an end adapted to engage an upstanding portion of said pawl to hold it in upright position out of engagement with said pins, a sheaf-carrier arranged to convey the sheaves successively from the binder-table to the receiver and deliver them to the latter, a lever-frame on which said sheaf-carrier is supported, a ratchet-wheel loosely mounted on the frame of the machine and having a projection adapted to engage and operate said trip-lever once at each revolution of said ratchet-wheel, and a pawl-rod pivotally connected to said lever-frame and engaging the teeth of said ratchet-wheel to advance the same by a predetermined portion of its revolution at each oscillation of said lever-frame, whereby to cause said clutch mechanism to be operated after the corresponding number of sheaves have been delivered to said receiver, substantially as described.

21. A grain-shocking attachment for self-binding harvesters, comprising a shocker-frame bolted to the main frame of the harvester beneath the binding-table thereof and extending laterally therefrom, a horizontal laterally-extending receiver-shaft journaled in said frame near the forward end thereof, a bracket-arm formed on the end of said shaft and rising above the level of the latter, a pyramid or cone shaped shock-forming receiver mounted on said bracket-arm and open at both ends and adapted to receive the sheaves and to be oscillated through approximately a right angle from the upright to the forward horizontal position, a rock-arm mounted to the shaft of said receiver and adapted to oscillate said shaft to operate the receiver, a short counter-shaft parallel to said receiver-shaft and journaled in said shocker-frame, a crank mounted on said counter-shaft opposite said rock-arm, a resilient link-connection between said crank and rock-arm, a bevel-gear loosely mounted on the end of said counter-shaft, a second bevel-gear keyed to the main operating-shaft of the harvester and engaging said first-mentioned gear, a pawl-block 50 keyed to said counter-shaft, a pawl 51 pivotally mounted thereon, a series of pins projecting from the rear face of the said bevel-gear and adapted to be engaged by said pawl when the latter is permitted to fall into oblique position, a trip-lever 54 having an end adapted to engage an upstanding portion of said pawl to hold it in upright position out of engagement with said pins, a sheaf-carrier arranged to convey the sheaves successively from the binder-table to the receiver and deliver them to the latter, a lever-frame on which said sheaf-carrier is supported, a ratchet-wheel loosely mounted on the frame of the machine and having a projection adapted to engage and operate said trip-lever once at each revolution of said ratchet-wheel, a pawl-rod pivotally connected to said lever-frame and engaging the teeth of said ratchet-wheel to advance the same by a predetermined portion of its revolution at each oscillation of said lever-frame, whereby to cause said clutch mechanism to be operated after the corresponding number of sheaves have been delivered to said receiver, a pair of swinging arms on which said sheaf-carrier is mounted and which are pivoted in the projecting ends of said lever-frame, a projecting finger 108 extending at the other side of the pivot of one of said swinging arms, an overhanging arm 109 projecting from the shocker-frame and adapted to be engaged by said finger to depress the same and thereby raise and tip said sheaf-carrier and empty the sheaf-carrier thereby into the receiver, retractile springs connecting the rear ends of said lever-frame with the shocker-frame to counterbalance the weight of the sheaf-carrier and lever-frame, and a retractile spring connecting said rock-arm with the rear end of the shocker-frame, whereby to counterbalance the weight of said receiver, substantially as described.

In witness whereof I have hereunto set my hand in the presence of two witnesses.

JAMES CARTER McDOUGALL.

Witnesses:
    JAS. L. McDOUGALL,
    ALLAN WINTERS.